United States Patent Office 3,353,969
Patented Nov. 21, 1967

3,353,969
METHOD OF SPRAY DRYING TOMATOES CONTAINING SEEDS
Peter P. Noznick and Robert H. Bundus, Chicago, Ill., assignors to Beatrice Foods Co., Chicago, Ill., a corporation of Delaware
No Drawing. Filed May 11, 1964, Ser. No. 366,610
4 Claims. (Cl. 99—204)

ABSTRACT OF THE DISCLOSURE

This invention relates to the spray drying of tomatoes containing seeds.

It has been proposed in the past to spray dry tomato juice but this proposal has not led to a commercially acceptable product.

When attempts are made to spray dry a tomato puree from which the seeds and skin have been removed the product does not spray dry satisfactorily.

It is an object of the present invention to spray dry tomatoes.

Another object is to prepare spray dried tomatoes having improved flavor and texture.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by spray drying a tomato puree containing the seeds. Desirably the puree also contains the skin as well, since a more readily spray driable product is obtained. It is critical that the seeds be ground so that 100% pass through a 40 mesh screen (Tyler sieve series). Generally there is no need to grind the seeds below 325 microns.

Example

Fresh San Marzano pear tomatoes from California were ground through a series head Urschel Mill (180 blades top, 200 blades bottom). The puree obtained was heated at 220° F. for 15 seconds to cook it, cooled to room temperature and then ground through a 212 blade Urschel Mill. The soluble solids (water soluble) of the puree were 3.5% by weight and the total solids were 4.34% by weight. The puree had a pH of 4.57, was dark red and had a viscosity of 3000 cps. The puree was then spray dried at an inlet temperature of 310° F. and an outlet temperature of 182° F.

The puree dried well to give a product with no tackiness. The material left in the cyclone portion of the spray drier caked slightly but the cake crumbled to a powder on cooling.

In the above example the weight of the skins was equal to the weight of the seeds.

While it is preferable to cook the puree this is not essential.

Also it is preferable to employ two separate grinding steps although only one such grinding is required providing the seeds are ground to pass through the 40 mesh screen (Tyler series).

What is claimed is:

1. A process comprising spray drying a tomato puree containing tomato seeds divided sufficiently to pass through a 40 mesh sieve to provide a nontacky spray dried product.

2. A process comprising spray drying a tomato puree containing the seeds and skin ground sufficiently that said seeds and skin pass through a 40 mesh sieve to provide a nontacky spray dried product.

3. A process comprising grinding whole tomatoes so that the seeds and skin pass through a 40 mesh sieve and a puree is formed and then spray drying said puree to provide a nontacky spray dried product.

4. A process comprising grinding whole tomatoes to form a puree containing ground seeds and skin, cooking said puree, grinding said puree to insure that the seeds and skin are reduced to a particle size which passes a 40 mesh sieve and then spray drying said ground puree to provide a nontacky spray dried product.

References Cited

Cruess et al.: "What's Known Today About Dehydrating Vegetables," Food Industries, April 1942, pp. 57–59 and 98.

A. LOUIS MONACELL, *Primary Examiner*.

M. VOET, *Assistant Examiner*.